United States Patent [19]

Lautenschläger

[11] Patent Number: 5,561,888
[45] Date of Patent: Oct. 8, 1996

[54] FURNITURE HINGE

[75] Inventor: Reinhard Lautenschläger, Reinheim, Germany

[73] Assignee: MEPLA-Werke Lautenschläger GmbH & Co. KG, Germany

[21] Appl. No.: 351,505

[22] Filed: Dec. 7, 1994

[30] Foreign Application Priority Data

Dec. 22, 1993 [DE] Germany .......................... 43 43 805.9

[51] Int. Cl.⁶ .................................. E05D 5/00; F16B 7/00
[52] U.S. Cl. ................................ 16/383; 16/382; 16/384; 16/254; 16/270; 403/297; 411/60
[58] Field of Search .............................. 16/383, 382, 384, 16/254, 264, 270; 403/297; 411/60, 55, 51, 50

[56] References Cited

U.S. PATENT DOCUMENTS 4,862,556 9/1989 Grass ........................................ 16/383

FOREIGN PATENT DOCUMENTS

| 270439 | 4/1969 | Austria . | |
| 1909284 | 9/1969 | Germany . | |
| 2457172 | 6/1976 | Germany ................................ | 16/383 |
| 2941520 | 4/1981 | Germany . | |
| 3126614 | 6/1982 | Germany . | |
| 8717482 | 1/1989 | Germany . | |
| 3722292 | 12/1989 | Germany . | |
| 9202876 | 6/1992 | Germany . | |

*Primary Examiner*—M. Rachuba
*Assistant Examiner*—Adesh Bhargava
*Attorney, Agent, or Firm*—Dvorak and Traub

[57] ABSTRACT

A furniture hinge (10) with a carcase-related part (12) which can be fastened adjustably on the carcase of a furniture piece, which is coupled to a door-related part by a linkage mechanism, and which is configured as a hinge cup (14) of metal. The cup part (18) of the hinge cup (14) can be mounted sunken in a mortise in the door and has a flange (20) lying on the inside of the door and projecting from the edge of the cup part. From the bottom of the flange protrude at least one, and preferably two, studs (32) provided with a number of anchoring ribs of pointed cross section, which can be mounted in associated, separate holes in the door. The stud (32) or studs are made expandable by a screw (30) in the manner of an expansion plug and are premounted on the flange by means of the screw being driven in only partially. Each stud is made as an integral injection-molded plastic piece having a plug portion (32a) and an enlarged back plate (32b) on the flange end of the plug portion, and further has at least one spacer element formed of at least one resiliently retroflexible spring arm section (42) integrally formed in the marginal area of the back plate (32b) of the stud.

13 Claims, 2 Drawing Sheets

FURNITURE HINGE

The invention relates to a furniture hinge with a carcase-related part which can be fastened adjustably on the carcase of a piece of furniture and is coupled by an articulation to a door-related part which is configured as a metal hinge cup whose cup part can be mounted in a mortise in the door and has a mounting flange lying on the inside of the door and projecting from the margin of the cup part, from the bottom of which at least one, preferably two, fastening studs provided with a number of circumferential anchoring ribs of pointed cross section which can be mounted in associated, separate bores in the door.

BACKGROUND OF THE INVENTION

The door-related parts of furniture hinges which are configured as hinge cups which can be sunk in the back of the door were originally made of plastic. These hinge cups were as a rule configured as insert cups which, in the area of the actual cup part to be pressed or hammered into the mortise in the door, were made over-size in proportion to the mortise, while circumferential ribs formed on the outside surface of the cup part with a saw-tooth-shaped cross section were to provide secure seating. In addition these plastic hinge cups were also frequently screwed to the door so as to further assure that the cup would be held in the door even if the wood of the door should fail. In the case of the metal hinge cups which have become increasingly popular of late and which do not have sufficient inherent elasticity for a reliable press fit in a mortise in wood doors, the cup part was then provided in its area facing the wall of the mortise with molded pieces of plastic. Furthermore, the metal hinges were also provided with a mounting flange lying against the inside of the door and reaching beyond the cup portion, in which at least one, preferably two bores were provided, through which the threaded shafts of fastening screws could be driven directly into holes in the back of the door or into plastic studs which could be pressed into corresponding holes in the door.

In all of these known hinge cups there are problems, insofar as they have to be installed either with suitable presses or by hammering them in place, so that removing them and reinstalling them is extremely problematic and time-consuming; in any case they can be installed only by craftsmen if the danger of damage to the mortise and/or holes in the door is to be avoided with the result that the hinges would no longer be held strongly enough on the door. On the other hand, there is an increase in the percentage of furniture sold unassembled, and of hinges as well, which are to be assembled by the purchaser himself, who as a rule is no carpenter. The cabinet walls and doors are sold packaged into compact bundles for shipment, with the hardware, and especially the hinges, packed separately. There is therefore a need for hinges which can be installed without difficulty even by unskilled persons and which can be disassembled, in case of a change in residence, for example, without the danger of damage to the wooden cabinet doors.

SUMMARY OF THE INVENTION

The invention is addressed to the problem of designing a furniture hinge with a metal cup which can be quickly and easily assembled and disassembled even by unskilled persons without the danger of damage to the mortise or holes in the door.

Setting out from a furniture hinge of the kind described above, this problem is solved by the invention by the fact that the fastening stud or studs are made expandable in diameter by means of a screw in the manner of an expansion plug and are preinstalled on the mounting flange by means of the screw which at first is only partially driven in. The expansion-plug-like fastening studs are thus preinstalled on the hinge cup in a state in which they are not yet expanded and can thus be introduced into the associated mounting holes easily and without hammering or applying strong pressure. Only thereafter, i.e., when the hinge cup has been inserted until its flange contacts the inside of the door, are the preinstalled screws drawn tight, thus spreading the studs and thus anchoring them securely in the associated holes.

The configuration is best made such that, between the top of the studs and the underside of the flange, there is provided at least one spacer means which in the premounted state will hold the stud away from the underside of the flange but which, when the screw is tightened, will be deformable such that the flange will be tightened against the inside of the door at least in its marginal area. The spacer means will assure that, in any case, sufficient additional tightening will be possible in order to draw the flange against the inside of the door in case this was not done with the necessary care during installation.

It is desirable that the diameter measured across the edges of the anchoring ribs of the studs should increase from the rib at the free end of the stud toward the last rib at the flange end thereof, and the last rib at the flange end should have a diameter corresponding substantially to the nominal diameter of the corresponding hole in the door. In this manner it is possible during the premounting of the studs to drive the screw into the stud sufficiently to hold the stud adequately in the premounted position. A slight spreading of the free end of the stud will then still not interfere with insertion into the holes in the door, because it will be compensated by a corresponding reduction of the diameter of the anchoring ribs.

The screws should preferably have a steep thread whose pitch, however, will still be in the self-locking range. Thus the fastening of the hinge cup after it is premounted will be performed with only a small number of turns of the screw, while avoiding any fear of loosening by the shocks or the like that are never entirely unavoidable in the use of the cabinet.

The stud or studs are preferably configured as plastic parts injection molded in one piece, from the actual stud portion that is to be inserted into the fastening hole in the door to an enlarged back plate at the end of the stud portion adjacent the flange. The spacer means, if any is to be used, can then be constituted by at least one leaf spring section integrally formed on the margin of the back plate and reaching up toward the mounting flange.

When a hinge cup is removed these leaf spring sections then become active in that they urge the flange of the cup away from the studs, but in the area of the elastic deformation of the leaf spring sections the studs are still kept in the intended installed position in alignment with the flange.

The stem part of the stud is preferably slotted at least once from its free end through a portion of its length to permit expansion when the screw is driven in. Multiple slotting with two or more slots at different angles is also possible.

In a first embodiment of the invention a bore for the screw is provided at least through a portion of the length of the stud, the diameter of which decreases at least at its end remote from the flange. As the screw is driven further into this portion of reduced diameter, the stud is then directly expanded by the screw.

The section of the screw directly adjoining its head can then be a substantially cylindrical, unthreaded section whose diameter is preferably made such that it is held with a light press fit in the associated hole in the flange of the hinge cup, while the bore in the stud has a diameter that is substantially equal to the diameter of the unthreaded section of the screw. In this configuration, therefore, the studs are held not only by the spacer means or leaf spring sections biased against the inside surface of the flange of the cup, but additionally by the screw driven slightly into the bore in the stud and held by a press fit in the hole in the flange.

In an alternative embodiment of the invention a through-bore is provided in the stud, which at its end remote from the flange has a section that flares conically toward the free end, into which a spreading body of complementary conicity is inserted, and the free end of the screw is driven into it. The expansion of the stud is then not produced by the wedging action of the screw itself but by the spreading pressure applied to the stud by the spreading body drawn into the interior of the stud by the screw. This embodiment has the additional advantage that, in the event of strains seeking to pull the hinge cup out of its fastened position, these forces will be transferred by the screws to the spreading bodies which then tend to be pulled further into the stud and at the same time to spread it to an even greater extent. That is to say, any great tensile strains will result in an increase of the strength of the seating of the studs in the corresponding holes.

In order to assure that the spreaders will not rotate with the screws when the latter are driven, it is expedient for the spreaders to have at least one projection extending from their conical surface into the slot in the stem of the plug. It is preferable to provide two such projections reaching out from the tapering surface of the spreader in diametrically opposite positions.

In an advantageous embodiment of the invention the sharp anchoring ribs have a substantially triangular cross section in which the sides of the triangle that correspond to the visible rib surface converge at a line running radially from the axis of the stud through the sharp edge, while the first side pointing from the edge toward the free end of the stud and generating the tapering rib surface forms with the axis of the stud a smaller angle than the second side facing back toward the flange and generating the rib surface sloping in this direction, and the angle enclosed between the stud axis and the second side is made smaller than 90°, preferably still slightly smaller than 90° by at least this angle than the angle to which the stud spreads open at its free end from its initial position. Thus the flanks of the ribs facing in the direction of extraction of the stud will still have a slight inclination even in the preinstalled state, so that when an extracting force is applied to the stud for the purpose of removal with the screw partially backed out will, on account of the bevel, encounter a component of force squeezing the stud contrary to the direction of expansion, and thus assure that the stud will come free of the corresponding hole.

BRIEF DESCRIPTION OF THE DRAWINGS

The invention is further explained in the following description of two embodiments in conjunction with the drawing, wherein.

DETAILED DESCRIPTION OF THE INVENTION

Figure 1:
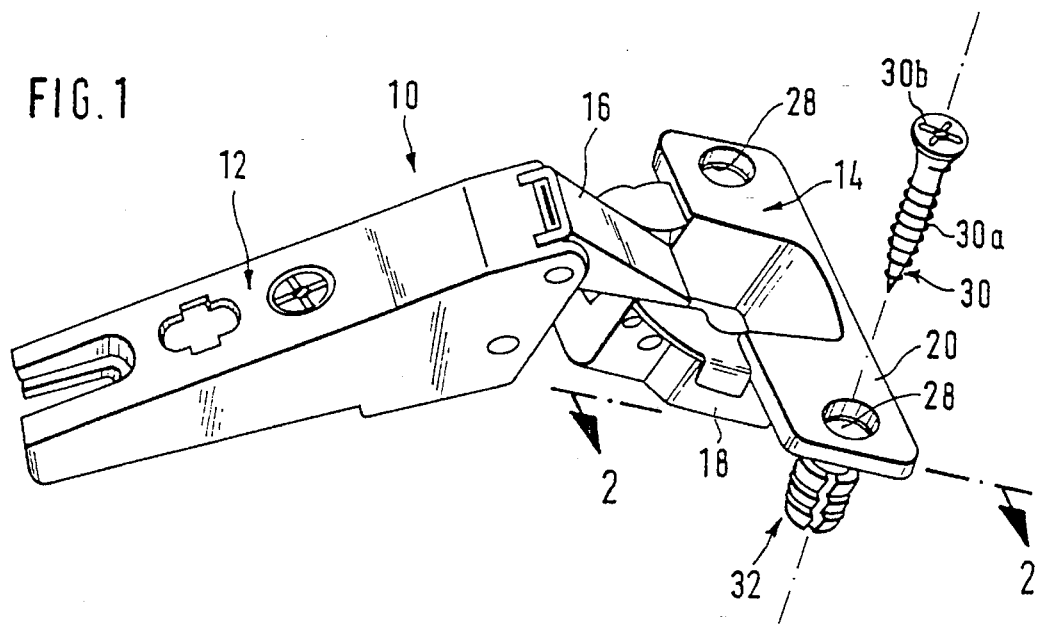
FIG. 1 is a perspective view of a four-joint furniture hinge with a hinge cup which is provided in the manner of the invention with two fastening studs on its mounting flange, only one of them shown schematically in the drawing; the screw that holds the stud on the flange is shown above the flange.

The hinge shown in FIG. 1 and identified as a whole by the number 10 is a so-called four-joint hinge which is shown in the open position. The hinge 10 is composed of a supporting arm 12 which can be fastened adjustably on a mounting plate (not shown) previously installed on the wall of a cabinet carcase. The supporting arm has a channel-shaped cross section and a hinge leaf 14 which has a cup 18 to be sunk in a mortise on the back of a door. The arm and hinge leaf are connected to one another by two links (only the upper link 16 being visible in the drawing) which are articulated at their extremities on the supporting arm 12 at one end and in the hinge leaf 14 at the other, such that the hinge leaf 14, and with it a door to which it is fastened, can pivot from the open position shown in FIG. 1 to a closed position.

Figure 2:
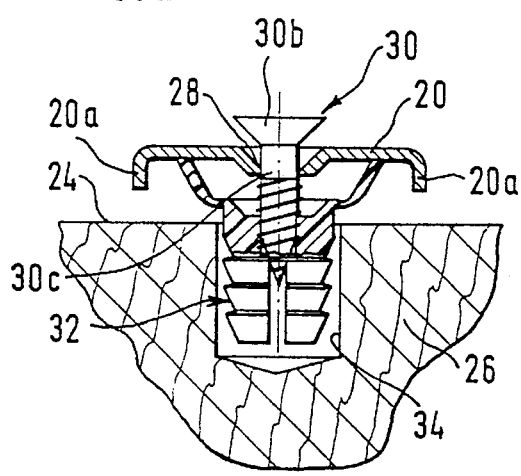
FIG. 2 is a view of a section through the mounting flange of the hinge cup, seen in the direction of arrows 2—2 in FIG. 1, which shows the fastening stud in the position in which it is pre-mounted on the flange when the corresponding fastening bore is inserted in the door.
Figure 3:
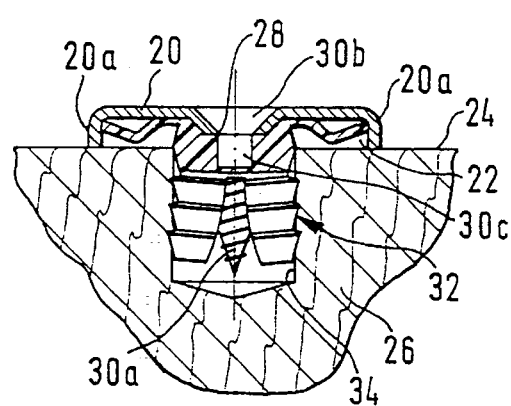
FIG. 3 is a view corresponding to FIG. 2, in which the stud is shown after the hinge cup is installed.

The hinge leaf 14, stamped in this case from sheet metal in a punch press, has on the upper margin of its cup 18 a mounting flange 20 extending laterally from the cup and lying against the inside of the door beside the mortise when in the correctly installed state. Along its margins it terminates in a narrow marginal bead 20a turned down toward the door. When the hinge leaf 14 is installed this margin encloses a shallow space 22 between the inside 24 of the door and the bottom side of the flange 20 (FIGS. 2 and 3).

Figure 4:
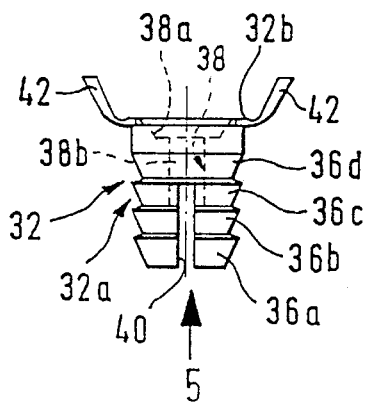
FIG. 4 is a side elevation of the fastening stud in the configuration shown in FIGS. 2 and 3.
Figure 5:
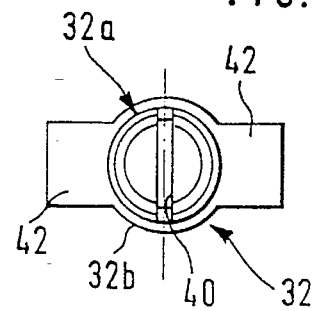
FIG. 5 is a view of the fastening stud as seen in the direction of arrow 5 in FIG. 4.

The flange 20 extending laterally beyond the cup 18 is provided with a countersunk mounting hole 28 at each end, through which the shaft 30a of a screw 30 can be driven into fastening studs 32 shown separately in FIGS. 4 and 5. In FIG. 1 only the stud 32 nearer to the observer is shown, and the corresponding screw 30 is shown suspended above the flange 20.

The head 30b of the screw 30 is shown in the drawing as a flat-head screw to conform to the countersunk hole 28.

The studs 32 are injection-molded from plastic and are made in the manner of an expansion plug whose diameter will be enlarged when the screws 30 are driven into them. They are preassembled on the flange 20 in the manner seen in FIG. 2, and during installation of the hinge leaf 14 they are inserted in this preassembled state into associated bores drilled in the inside 24 of the door alongside the mortise for the cup part 18. In the embodiment shown in FIGS. 2 to 5 the studs 32 are provided at their bottom end with circumferential anchoring ribs 36a to 36d which have a triangular cross section and whose flanks facing in the direction of the insertion of the stud 32 into the hole 34 slope at an angle at which the sides of the triangular cross section form a relatively acute angle with the axis of the stud. The studs 32 have a bore 38, opening at the top in a countersink 38a, to accommodate the shaft 30a of the screw 30 which is configured in its portion adjoining the countersink 38a as a cylindrical section 38b whose diameter is approximately equal to the diameter of an unthreaded section 30c of the shaft 30a of the screw 30 which directly adjoins the head 30b of the screw 30. The cylindrical section 38b of the bore 38 extends through only about half of the length of the stud 32, and then terminates in a longitudinal slot 40 which is made from the free end into the stud portion 32a of the stud 32 through a portion of the length of the stud, and divides the stud into two sections. A spring plate 32b is molded at the flange end of the stud 32a, and reaches beyond the diameter of the anchoring ribs 36a to 36d. On opposite sides of this spring plate spring arms 42 pointing upward at an angle toward the flange 20 are provided which, when the stud 32 is installed, come in contact with the bottom of the flange and initially hold the ribbed part 32a at a distance from the bottom of the flange. When preinstalling the stud 32 on the flange 20, the screw 30 is driven through the bore 28 in the flange until its unthreaded portion 30c enters into the narrowest cross section formed on the bottom of the countersink, where it is held with a slight press fit. At the same time the threaded front end of the screw has entered into the transition between the cylindrical section 38b of bore 38 and the two stud portions formed by the slot 40 and has slightly spread apart the two stud portions formed by the slot 40 by the entry of the first threads. In this manner the stud 32 is premounted in flange 20 in the manner illustrated in FIG. 2.

The diameters of the anchoring ribs 36a to 36b with the stud portion 32a unexpanded are graded such that the foremost rib 36a in the direction of insertion has a slightly smaller diameter than the next rib 36b which in turn has a smaller diameter than rib 36c, which finally has a slightly smaller diameter than rib 36d. This is intended to assure that even in the slightly expanded state prior to preinstallation the stud 32 can still be inserted into the corresponding hole 34.

FIG. 3 shows the hinge cup in the fully installed state on the door 26. The screw 30 is fully driven into the stud 32, which has expanded from its free end up, while the anchoring ribs 36a to 36d have embedded themselves in the wall of the hole 34. The head 30b of the screw 30, fully driven into the countersink of bore 28 has drawn the cup flange and resiliently bent the spring sections 42 into contact with the inside 24 of the door 26. By selecting a comparatively steep pitch of the thread portion 30a of screw 30, this tightening can be completed with only a few turns of a screwdriver.

Figure 6:
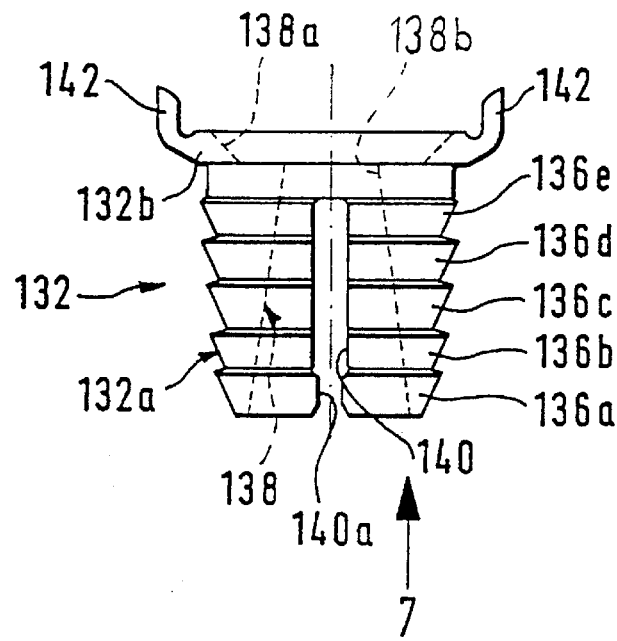
FIG. 6 is a side elevation of a modified fastening stud.
Figure 7:
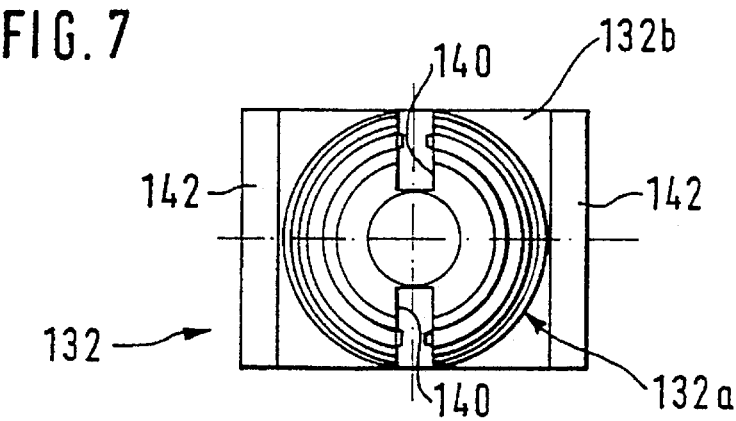
FIG. 7 is a view of the fastening stud seen in the direction of arrow 7 in FIG. 6.
Figure 8:
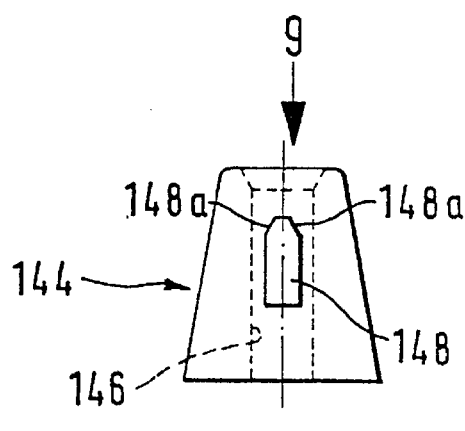
FIG. 8 is a side elevation of a spreader serving to expand the stud shown in FIGS. 6 and 7.
Figure 9:
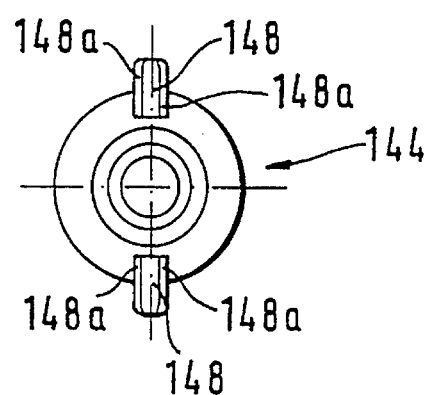
FIG. 9 is a view of a spreader seen in the direction of arrow 9 in FIG. 8.

In FIGS. 6 and 7 there is shown a stud 132 that is different from stud 32 and which is expandable not directly by the screw 30 but by a separate spreader 144 represented in FIGS. 8 and 9, into which a screw can be driven.

To avoid repetition, only those modifications of the stud 132 that distinguish the latter from studs 32 will be described, while it will suffice to consult the above description to find those features that are the same, inasmuch as functionally equal parts of studs 32 and 132 have the same reference numbers in the corresponding drawings, except that a "1" precedes in the case of stud 132.

The bore 138 in stud 132 is composed of the countersink 138a corresponding to countersink 38a, and an adjoining section 138b passing completely through the stud and flaring conically toward the free end of the stud portion 132a. The matching conical spreader 144 shown in FIGS. 8 and 9 is inserted into the conical section 138b. The spreader 144, which advantageously is made by injection molding from plastic but also can be made of metal, e.g., die-casting zinc alloy (Zamak), contains a bore 146 passing lengthwise through it, whose diameter is slightly less than the diameter of the threaded portion of a screw 30 driven into it, so that the threads of the shaft section 30a of screw 30 cut by themselves a complementary female thread in bore 146. For preinstallation, the procedure is again the same as the preinstallation of stud 32, i.e., stud 132 is preinstalled on the bottom of flange 32 by passing screw 30 through the countersunk bore 28 and driving it into the bore 146 of the spreader 144 inserted into the tapered section 138b of the stud portion 132a, the screw being driven only so far that the free ends of the spring sections 142 are just held in contact with the bottom of the cup flange.

When the screw 30 is driven, to prevent the truncoconical or conical spreader from turning with it in section 138, projections are provided which protrude at diametrically opposite locations from the truncoconical surface of the spreader 144, the width of which is just equal to the width of the slot 140. The projections 148 entering into the slot reliably prevent the spreader 144 from turning with the screw 30 when it is tightened.

The upper ends of the projections 148 are provided with raps 148a on both sides, and when the spreader 144 is installed in section 138b they spread open the narrowed mouth 140a of the slot 140. As soon as the projections 148 are then driven into the actual slot 140, the mouth 140a narrows again, and the spreader 144 is held securely in stud portion 132a.

With regard to the configuration of the anchoring ribs 36a to 36d and 136a to 136e, it is to be added that the rear flank of these anchoring ribs is not radial but slopes back from the forward flank, to such an extent that, even in the outspread state a certain slope remains and thus, when the screw 30 is backed out and a force is applied to hinge cup 14 in the direction of extraction, a component of force will be formed between the bore and the sloping flanks of the anchoring ribs which seeks to force the expanded stud back into the unexpanded original position.

In the two embodiments described above, spring arm sections 42/142 are provided which in the preinstalled state hold the studs 42/142 at an interval below the bottom of the flange 20, and thus make available a tightening gap making it possible, by the resilient deformation of spring arm sections 42/142, to tighten the flange against the inside 24 of the door 26 even after the studs are already held tight in the associated holes 34. The integral spring arm sections 42/142, however, can also be omitted. Then, when the hinge cup 14 is installed, it is necessary only to make sure that the studs preinstalled by means of the screws 30 are inserted all the way into their associated holes 34 until the supporting plates 32b/132b provided on their end adjacent the flange are in contact with the inside 24 of the door, so as to assure that the flange 20 of the hinge cup 14 can then be tightened with the screws against the inside of the door 26. The support plate 32b/132b provided at the flange end of the stud 32a/132a is then made of such dimensions that at least one of its edges is in contact with the inside of the bead 20a of the associated flange and secures the stud against rotation relative to the flange when the screw is driven in.

I claim:

1. Furniture hinge with a carcase-related part which can be adjustably fastened to the carcase of a furniture piece and which is coupled for pivoting on a joint mechanism to a door-related part which is configured as a hinge cup of metal whose actual cup can be installed in a mortise in the door (26) and has a mounting flange (20) lying on the inside of the door and projecting from the margin of the cup part, from the underside of which projects at least one, preferably two mounting studs (32; 132) provided with a plurality of circumferential anchoring ribs of pointed cross section, which can be installed in associated, separate mounting holes, characterized in that the mounting stud or studs (32; 132) are made as an integral injection-molded plastic piece of an actual plug portion (32a; 132a) to be inserted into a corresponding hole (34) in the door (26), said studs having an enlarged back plate (32b; 132b) on the flange end of the plug portion, and are made expandable by means of a screw (30) in the manner of an expansion plug, and are preinstalled on the mounting flange (20) by means of the screw (30) at first being only partially driven in, and said studs further having at least one spacer element formed of at least one resiliently retroflexible spring arm section (42; 142) integrally formed in the marginal area of the back plate (32b; 132b) and projecting toward the bearing area on the underside of the mounting flange (20) toward the mounting flange.

2. Furniture hinge according to claim 1, further characterized in that, between the end face of the mounting stud (32; 132) at the mounting flange (20) and the bottom of said mounting flange (20) at least one spacer element is disposed which holds the stud (32; 132) in the preinstalled state at a distance from the mounting flange bottom, but when the screw (30) is tightened said spacer element is deformable such that the mounting flange can be tightened in its marginal area into contact with the inside of the door.

3. Furniture hinge according to claim 1, characterized in that the diameters measured across the sharp circumferential edges of the anchoring ribs (36a to 36d; 136a to 136e) on the studs (32; 132) increase from the rib (36a; 136a) provided at the free end of the stud (32; 132) toward the last anchoring rib (36d; 136e) at their flange end, while the last anchoring rib (36d; 136e) at the flange end has a diameter corresponding substantially to the nominal diameter of the corresponding hole (34) in the door (26).

4. Furniture hinge according to claim 3, characterized in that the screws (30) have a fast thread but one whose pitch is still within the self-locking range.

5. Furniture hinge according to claim 1, characterized in that the plug portion (32a; 132a) is slotted at least once (slot 40, 140) from its free end remote from the flange over a portion of its length.

6. Furniture hinge according to any one of claim 5, characterized in that a bore (38) opening in the back plate (32b) is provided in the stud (32) to accommodate the screw (30) and extends at least through a portion of the length of the stud, its diameter diminishing at least in its end portion remote from the flange.

7. Furniture hinge according to claim 6, characterized in that the section (30c) of the shaft (30a) of the screw (30) immediately adjacent the head (30b) is a substantially cylindrical, unthreaded section whose diameter is selected such that it is held with a light press fit in the associated hole (28) in the flange (20) of the hinge cup (14), and that the bore (38) in the stud (32) in the end portion (38b) at the flange has a diameter that corresponds substantially to the diameter of the unthreaded shaft section (30c) of the screw (30).

8. Furniture hinge according to any one of claim 5, characterized in that a through-going bore (138) is provided in the stud (132), which in its end portion remote from the flange has a section (138b) flaring conically toward the free end, into which a complementary conical spreader (144) is inserted, into which the free end of the screw (30) is driven.

9. Furniture hinge according to claim 8, characterized in that the spreader (144) has at least one projection (148) protruding from its conical boundary surface into the slot (140) of the plug portion (132a).

10. Furniture hinge according to claim 9, characterized in that two projections (148) protruding from the boundary surface of the spreader (144) on diametrically opposite locations are provided.

11. Furniture hinge according to claim 1, characterized in that the anchoring ribs (36a to 36d; 136a to 136e) have a substantially triangular cross section, whose sides producing the visible rib surfaces have opposite inclinations with reference to a straight line laid from the longitudinal axis of the plug through the sharp edge, while the first side pointing from the edge to the free end of the stud (32; 132) and producing the tapering rib surface forms a smaller angle with the longitudinal central axis of the stud (32; 132) than the second side pointing back to the flange (20) and producing rib surfaces tapering in this direction, and the angle included between the longitudinal axis of the stud and the second side is selected to be less than 90°.

12. Furniture hinge according to claim 11, characterized in that the angle included between the longitudinal axis of the stud and the second side is made less than 90° by the angle by which the plug spreads apart at its free end from its starting position when the screw (30) is driven in during the mounting procedure.

13. Furniture hinge according to claim 12, characterized in that the angle included between the longitudinal axis of the stud and the second side is at least slightly smaller than the maximum angle to which the stud (32; 132) spreads apart during the mounting procedure when the screw (30) is driven in.

* * * * *